United States Patent [19]
Kuchler et al.

[11] Patent Number: 5,894,094
[45] Date of Patent: Apr. 13, 1999

[54] WHEEL FORCE MEASURING HUB ASSEMBLY

[75] Inventors: Maximilian Kuchler, Munich; Hubert Meier, Dachau; Friedrich Nohl, Neuried; David-Alfredo Ferrufino-Camacho, Dingolfing, all of Germany

[73] Assignee: Bayerische-Motoren Werke Aktiengesellschaft, Munich, Germany

[21] Appl. No.: 08/889,155

[22] Filed: Jul. 7, 1997

[30] Foreign Application Priority Data

Jul. 6, 1996 [DE] Germany .......... 196 27 385

[51] Int. Cl.$^6$ .................... G01L 5/16
[52] U.S. Cl. .................... 73/862.044; 73/146
[58] Field of Search .......... 73/862.041, 862.042, 73/862.043, 862.044, 862.045, 146

[56] References Cited

U.S. PATENT DOCUMENTS

| | | | |
|---|---|---|---|
| 3,867,838 | 2/1975 | Gerresheim | 73/146 |
| 4,448,083 | 5/1984 | Hayashi | 73/862.04 |
| 4,573,362 | 3/1986 | Amiani | 73/862.044 |
| 4,969,366 | 11/1990 | Okada . | |
| 5,313,828 | 5/1994 | Kotzle et al. | 73/146 |
| 5,343,765 | 9/1994 | Okada | 73/862.043 |
| 5,490,427 | 2/1996 | Yee et al. . | |
| 5,540,108 | 7/1996 | Cook et al. | 73/862.624 |

FOREIGN PATENT DOCUMENTS

| | | |
|---|---|---|
| 0 143 434 | 6/1985 | European Pat. Off. . |
| 0 570 671 | 11/1993 | European Pat. Off. . |
| 0575634 | 12/1993 | European Pat. Off. . |
| 21 04 003 | 8/1972 | Germany . |
| 2104003 | 8/1972 | Germany . |
| 2302540 | 7/1974 | Germany . |
| 3213319 | 10/1982 | Germany . |
| 32 13 319 | 10/1982 | Germany . |
| 2708484 | 7/1983 | Germany . |
| 4311903 | 10/1984 | Germany . |
| 8229529 | 9/1986 | Germany . |
| 3715472 | 11/1987 | Germany . |
| 3627381 | 2/1988 | Germany . |
| 3838810 | 5/1990 | Germany . |
| 4208522 | 9/1993 | Germany . |
| 4430503 | 2/1996 | Germany . |
| 2039063 | 7/1980 | United Kingdom . |
| 9218840 | 10/1992 | WIPO . |
| WO 95/23325 | 8/1995 | WIPO . |

*Primary Examiner*—Max H. Noori
*Attorney, Agent, or Firm*—Evenson, McKeown, Edwards & Lenahan, P.L.L.C.

[57] ABSTRACT

A wheel force measuring hub assembly has a measuring value sensor assembly and comprises an exterior ring part and an interior ring part. A wheel rim is attachable on the exterior ring part. The interior ring part is attachable to a wheel axle. Both ring parts are connected with one another by way of radially extending measuring webs on which strain gauges are arranged for determining forces and torques to be measured. The strain gauges are configured to determine the three mutually perpendicular axial occurring forces Fx, Fy and Fz as well as pertaining torques Mx, My and Mz. The strain gauges are arranged, aligned and connected with one another for determining all forces and torques by way of the shearing strains occurring in the case of a load on a wheel being monitored.

53 Claims, 11 Drawing Sheets

WHEEL FORCE MEASURING HUB ASSEMBLY

BACKGROUND AND SUMMARY OF THE INVENTION

The invention relates to a wheel force measuring hub assembly with an exterior ring part attachable to a wheel rim, an interior ring part attachable to a vehicle axle, measuring webs connecting the ring parts and strain gauges on the measuring webs.

In German Patent Document DE-OS 2302540, an assembly is described which has an exterior ring part, an interior ring part and four measuring webs which connect both ring parts with one another and are each angularly offset by 90° with respect to one another. On the measuring webs, strain gauges are arranged in order to be able to detect the forces acting upon the wheel.

From German Patent Document DE-OS 3213319 an assembly is also known which has a central hub part, a rigid, ring-shaped rim part and four spoke parts. The four spoke parts extend from the hub part at a right angle with respect to one another radially to the outside and each have a rectangular cross-section. In addition, four chord parts are provided which, in the center, are connected with the exterior ends of corresponding spoke parts and are connected with their two ends with respective rim parts. For measuring the forces acting upon the assembly, strain gauges are provided on the four spoke parts and—connected in corresponding bridge circuits—supply the corresponding signals for the individual forces and torques to be determined.

However, by means of the respective wheel force measuring assemblies described in the above-mentioned published patent applications, it is not possible to satisfactorily, separately and uninfluenced from one another and with the exclusion of external environmental influences, measure the forces and torques to be determined, specifically the longitudinal force of the wheel Fx, the wheel contact force Fz, the lateral force of the wheel Fy, the camber torque Mx, the return torque Mz, and the braking torque My.

It is an object of the invention to further develop a wheel force measuring assembly of the initially mentioned type such that the forces and torques to be determined can be precisely determined without influencing one another. Also, the rotational wheel speed should be determined in a high-resolution manner.

This and other objects are achieved by preferred embodiments of the present invention wherein said strain gauges are configured such that substantially all wheel forces are determined by way of shearing strains on said strain gauges.

Accordingly, in the case of a wheel force indicator of the initially mentioned type, the strain gauges are arranged, aligned and connected with one another on the measuring webs such that all forces and torques can be determined exclusively by way of the shearing strain occurring during the loading. By means of this measure, it is possible to optimally decouple the individual force and torque components from one another and to sense them separately. The advantage of this measuring method will be explained in the following.

According to a preferred embodiment of the invention, openings or oblong holes are arranged in the area of the transition between the measuring webs and the exterior ring part. Beyond the above-mentioned measure, this permits a still better decoupling of the corresponding forces and torques so that only one type of forces and torques is introduced into the individual measuring webs, whether they are aligned perpendicularly with respect to or in the driving direction. In this case, the dimensioning of the openings or oblong holes preferably takes place such that the separation of forces and torques as well as a considerable increase of the measuring sensitivity is achieved in an optimal manner.

According to a preferred embodiment of the invention, a signal processing, transmitting and analyzing device is provided which transmits the data obtained by means of the strain gauges during a measuring operation from the rotating wheel force measuring hub assembly to a part fixed to the vehicle.

A radio transmission can also be used for this purpose. As an alternative, the transmission can be carried out by means of an infrared telemetry transmission device. This makes it possible to transmit the plurality of the occurring data rapidly and without errors from the rotating hub assembly to a corresponding measuring data sensing device in the vehicle.

For analyzing the corresponding signals of the strain gauges on the measuring webs, it is required to precisely know the position of the wheel on the vehicle or of the measuring value generator so that it can be indicated whether the measuring webs are aligned perpendicularly to or in the driving direction. For this purpose, preferably at least one Hall sensor is provided which interacts with a pulse ring connected with the measuring-value sensor. An electronic control unit can analyze the data supplied by the Hall sensor and a conclusion can be drawn therefrom on the position of the measuring hub assembly. The pulse ring can be fastened, for example, on the exterior ring part of the hub assembly. The Hall sensor is fixedly arranged on the vehicle. As an alternative, other angle position sensing devices can also be used.

According to a preferred embodiment of the invention, two Hall sensors are provided which are angularly offset with respect to one another such that a rotating direction sensing is permitted. As a result, not only the absolute position of the wheel indicator and, by the encoding of the pulse ring, the 0°-angle of the measuring system can be easily determined as well as also the rotating direction.

A control arrangement can also be accommodated in the interior ring part so that already analyzed data can be transmitted by way of a transmission device to another control and analysis unit in the vehicle. The transmitted measuring signals can be used for the development and control of driving dynamics control systems.

According to especially preferred embodiments the strain gauges which sense only shearing strains are arranged in a special manner for being able to appropriately sense the forces and torques to be determined. In particular, arranging possibilities are also indicated for connecting the strain gauges with one another to full bridge circuits so that a particularly well resolving and precise measuring arrangement is ensured. The corresponding advantages and characteristics are therefore further described in the following.

It is also an advantage for the strain gauges on the measuring webs to be covered, for example, by means of a casing of the measuring webs so that environmental influences (such as the radiation heat in the surrounding field of the torque indicator during a braking operation) can have no effect on the measuring results. Nevertheless, care should be taken that the cooling is sufficient.

Other objects, advantages and novel features of the present invention will become apparent from the following detailed description of the invention when considered in conjunction with the accompanying drawings.

BRIEF DESCRIPTION OF THE DRAWINGS

FIG. 7b is a view of the wiring arrangement as in FIG. 6b, the connecting of the strain gauges having taken place corresponding to FIG. 7a;

FIG. 8b is a view of a wiring arrangement in a full-bridge circuit which reflects the connecting of the strain gauges in FIG. 8a;

FIG. 10b is a view of an electric wiring arrangement in a full bridge circuit, which again shows the connections according to FIG. 10a;

FIG. 11b is a view of a wiring arrangement which corresponds to the connection of the strain gauges in FIG. 11a.

DETAILED DESCRIPTION OF THE DRAWINGS

Figure 1:
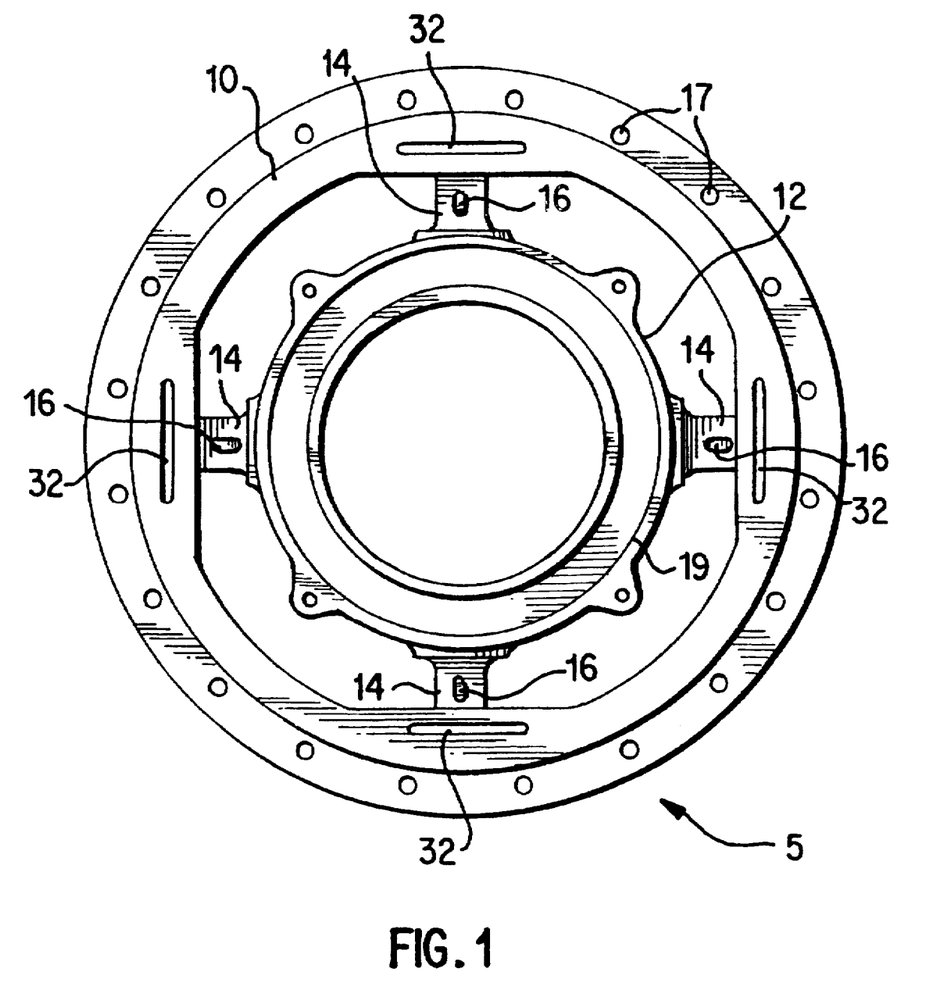
FIG. 1 is a schematic axial view of a wheel force measuring hub assembly utilizing strain gauges arranged on the measuring webs and constructed according to a preferred embodiment of the invention.

FIG. 1 illustrates an embodiment of a wheel force measuring hub assembly 5 showing central parts thereof. In particular, an exterior ring part 10 and an interior ring part 12 are shown as well as the measuring webs 14 which connect the two ring parts and on which measuring webs strain gauges 16 are arranged on the corresponding surfaces. The arrangement as well as the connection of the corresponding strain gauges 16 will be discussed in the following.

In the exterior ring part 10, bores 17 are provided by way of which a rim of a wheel which is not shown can be fixed by means of screws.

On the interior ring part 12, a wheel flange 18 (FIG. 2) is fastened which in use is disposed on the axle of a vehicle. At the same time, a space 19 exists in the interior ring part 12, in which space the electronic plate bars for the strain gauge connections, measuring amplifiers and computing processors are accommodated which establishes the connection to the electronic data and energy transmission system 23.

Figure 2:
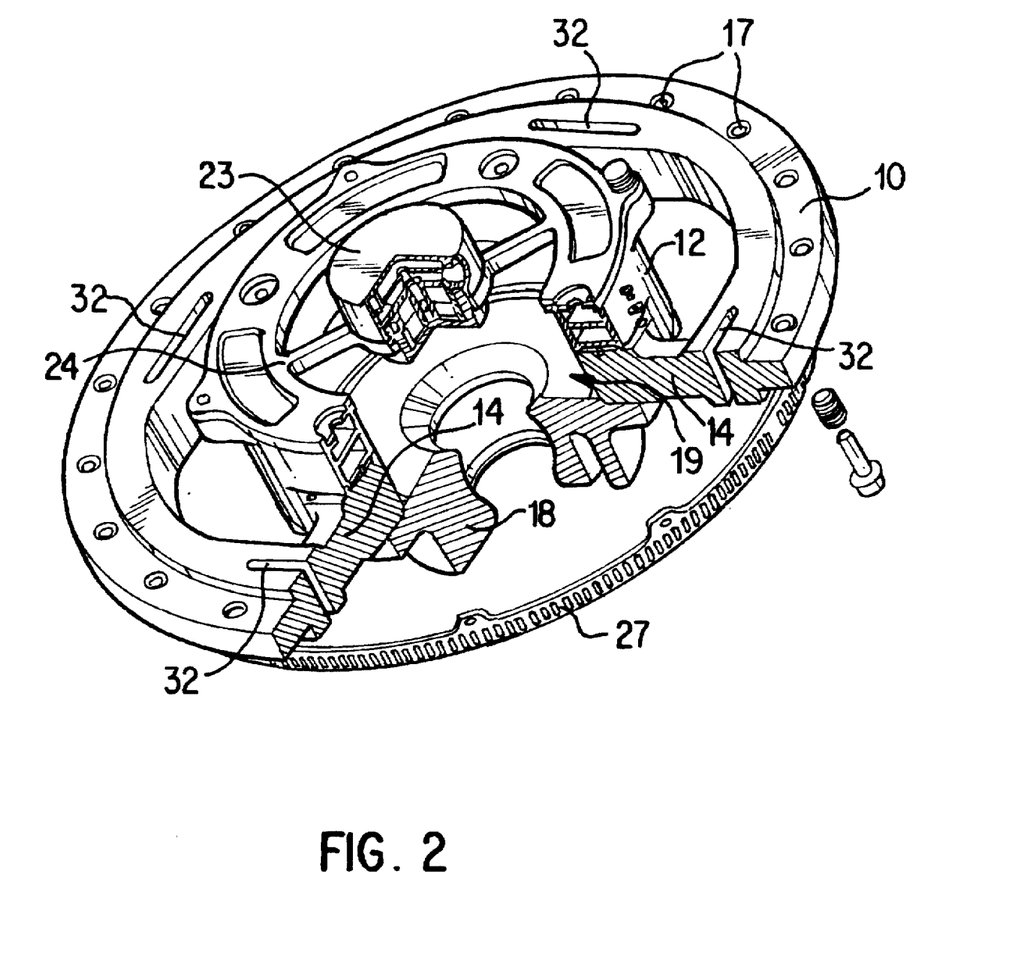
FIG. 2 is a part sectional perspective view of the wheel force measuring hub assembly of FIG. 1 showing a pulse ring as well as an electronic data and energy transmission system arranged on the interior ring part being illustrated, and the interior ring part partially constructed in the shape of a housing representing electronic plate bars for measuring amplifiers and computing processors.

FIGS. 1 and 2 also show four oblong holes 32 which are each arranged between the measuring webs 14 and the exterior ring part 10 in such a fashion that a spoke-type connection is established, in which case the spoke ends merge into the exterior ring part 10 and the spoke center part is connected with the respective measuring web 14.

Figure 4:
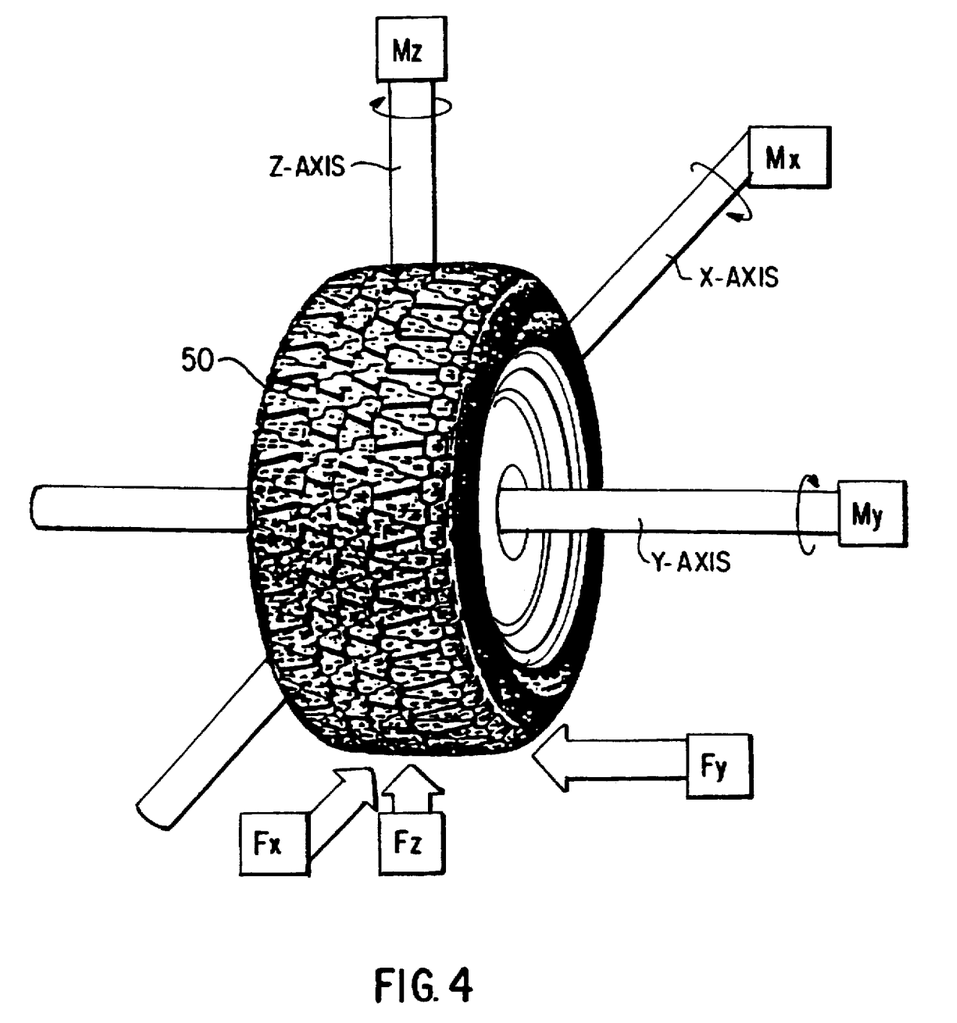
FIG. 4 is a basic schematic diagram of a wheel with forces and torques affecting it, used to illustrate the forces to be measured utilizing the present invention.

For a better understanding, some principles will be discussed first. In the case of a load, exterior forces and torques are applied to the vehicle wheel 50. As illustrated in FIG. 4, these are the longitudinal force Fx in the direction of the X-axis, the lateral force Fy in the direction of the Y-axis and the wheel contact force Fz in the direction of the Z-axis. In addition, pertaining torques occur, such as the camber torque Mx about the X-axis; the braking drive torque My about the Y-axis; and the return torque Mz about the Z-axis. All quantities should be sensed simultaneously. In this case, a strain gauge in fact measures the strain and not the force. It must therefore be constructed and arranged such that the force to be measured generates a suitable material tension in the measuring element. As a function thereof, a corresponding strain is caused which corresponds to the deformation caused by the occurring forces. The relationship between the introduced force and the measured signal is to be linear and hysteresis-free. In addition, the calculation of bending rods is based on ideal bending beams. Therefore, a solution according to the invention is to be worked out which is independent of the lever ratios for which the receiving of the measuring signals is suitable by means of strain gauges applied to shearing strain. This measuring method forms the essence of the present measuring arrangement.

In the case of normal tensions, the tensile or pressure forces occurring in opposite directions generally always act in the same axis. These forces try to extend (tensile) or upset/compress (pressure) the material.

Figure 5A:
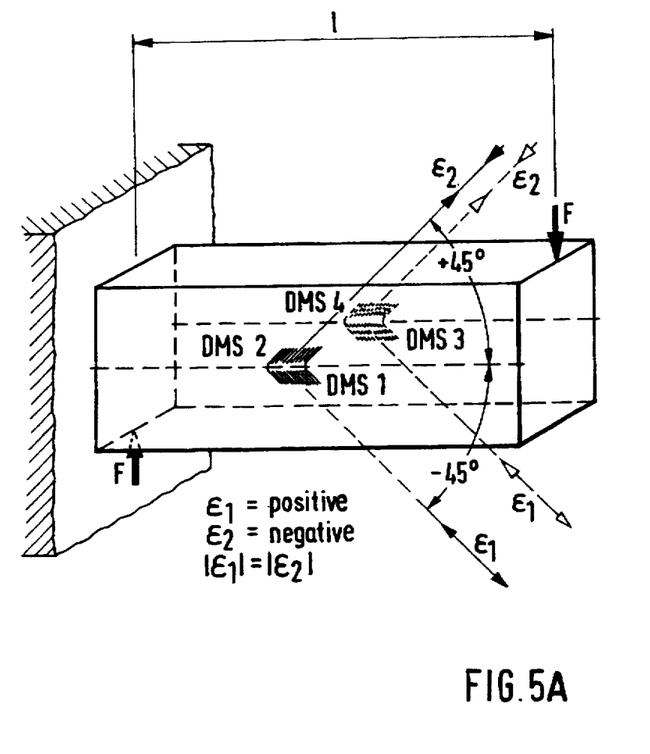
FIG. 5 is a basic diagram of a measuring rod on which strain, gauges are arranged for detecting shearing strains, used to illustrate the operation of strain gauges to measure forces in preferred embodiments of the present invention.
Figure 5B:
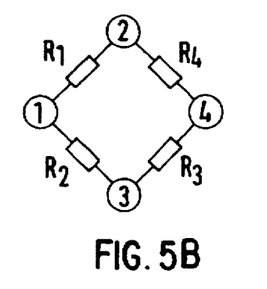

Similarly to how the shearing strains occur in the case of the torque rod in connection with a torque, in the case of the shear rod, they occur in connection with a bending moment. FIG. 5 shows a beam which is clamped in on one side and which is loaded at a distance L with a force F. As the result of the equally large reaction force at the clamping-in point, a pair of forces in opposite directions occurs.

As in the case of the torque rod, the normal tensions associated with the shearing strains extend at an angle of 45° with respect to the shearing plane. Simultaneously, the force F times the distance L causes a bending moment; the bending stresses generated thereby are superimposed on the normal tensions. Therefore, the angle indication ±45° applies exactly only at the height of the neutral fiber layer where the bending stresses become zero. The axes of the coordinates rotate toward the edges so that the edge stresses extend in parallel to the edges. It is therefore important to bring the strain gauges (DMS1–DMS4 in FIG. 5) as close as possible to the neutral fiber. In biaxial strain fields, the wire strain gauges are used with several grids which are arranged above or next to one another in certain directions. The grids, which are embedded at minus 45° with respect to the longitudinal axis, are particularly suitable for measuring the shearing strain on the surface of measuring bodies. In the present embodiment described below, for sensing the six components (three axial forces and three torques) a total of eighty wire strain gauges are applied to the measuring bodies.

Strain gauges are passive sensors which are fed by direct or alternating current. The respective strain causes a small change of resistance in the strain gauges which can be determined by means of a tension change. As a principal circuit, a Wheatstone bridge is used which is illustrated in FIG. 5 as a full bridge. This full bridge is formed by four so-called bridge branches, in FIG. 5 each strain gauge being assigned to one resistor respectively (DMS1=R1, etc.). The bridge supply voltage P is fed to one bridge diagonal (U_E). The signal output voltage F is tapped on the other bridge diagonal (U_A).

By means of FIG. 5, the measuring principle by means of shearing strains is to be explained. The strain values of adjacent bridge branches are subtracted in the case of a strain in the same direction and are added in the case of a strain in the opposite direction. In order to obtain a very good sensitivity, all strain gauges which result in a positive change of resistance (strain) must be connected in the bridge branches which are situated opposite one another. Correspondingly, the strain gauges which experience a negative change of resistance (upsetting or compressing) are applied in the adjacent bridge branches. Consequently, the strain values of all strain gauges will add up and the value of the signal is larger than in the case of a single strain gauge. As a result, bending elongations, thermal expansions, strains from tensile and pressure forces are automatically compensated.

In the present embodiment, two strain gauges respectively are arranged in a suitable alignment on a carrier foil. As will again be explained in detail in the following, eight strain gauges for sensing the component Fx are applied to the front and rear side of measuring webs 1 and 2 and eight strain gauges for measuring the force Fz are applied to the front and rear side of measuring webs 3 and 4. For measuring the lateral force Fy, a total of sixteen wire strain gauges are glued to the center on the left and right side of all measuring webs (FIGS. 6a–8b). For sensing the signal of the torque Mx, like with Fx the measuring webs 1 and 2 are used but, on the left and the right side of these measuring webs, four strain gauges respectively are mounted and connected. A similar circuit is used during the measurement of the torque Mz on the measuring webs 3 and 4.

The signal of the braking drive torque My is sensed by sixteen strain gauges glued to the front and rear side of all measuring webs (compare FIGS. 9a–11b).

The arrangement of the strain gauges takes place by means of the use of a hot-hardening bonding agent, and after the hardening, the measuring points are coated by a polyurethane lacquer. This coating is used as a protection against humidity and other environmental influences.

The Wheatstone bridge circuit can be fed with direct current as well as with alternating current.

In the following, the more detailed arrangement and connecting of the strain gauges for detecting the three forces and the three torques will again be explained by means of FIGS. 6–11. These figures each illustrate a wiring diagram of the strain gauge bridges of the hub assembly, in which case the alignment is also clearly defined by the indication of the system of coordinates (X-direction, Z-direction and Y-direction). With respect to this system of coordinates, the top, bottom, right and left of FIGS. 6–11 show the corresponding measuring webs 1 to 4 by means of one illustration of their four surfaces respectively, in which case the surfaces $F_{1,2}$, $F_{1,4}$, $F_{2,2}$, $F_{2,4}$, $F_{3,2}$, $F_{3,4}$, $F_{4,2}$ and $F_{4,4}$ are each aligned in parallel to the radial surface of the hub assembly or of the measuring value sensor. The other surfaces $F_{1,1}$, $F_{1,3}$, $F_{2,1}$, $F_{2,3}$, $F_{3,1}$, $F_{3,3}$, $F_{4,1}$, $F_{4,3}$ are each aligned perpendicularly to the radial plane but, in FIGS. 6–11, they are each shown in one image plane in order to be able to more precisely show the connecting of the respective strain gauges.

Figure 6A:
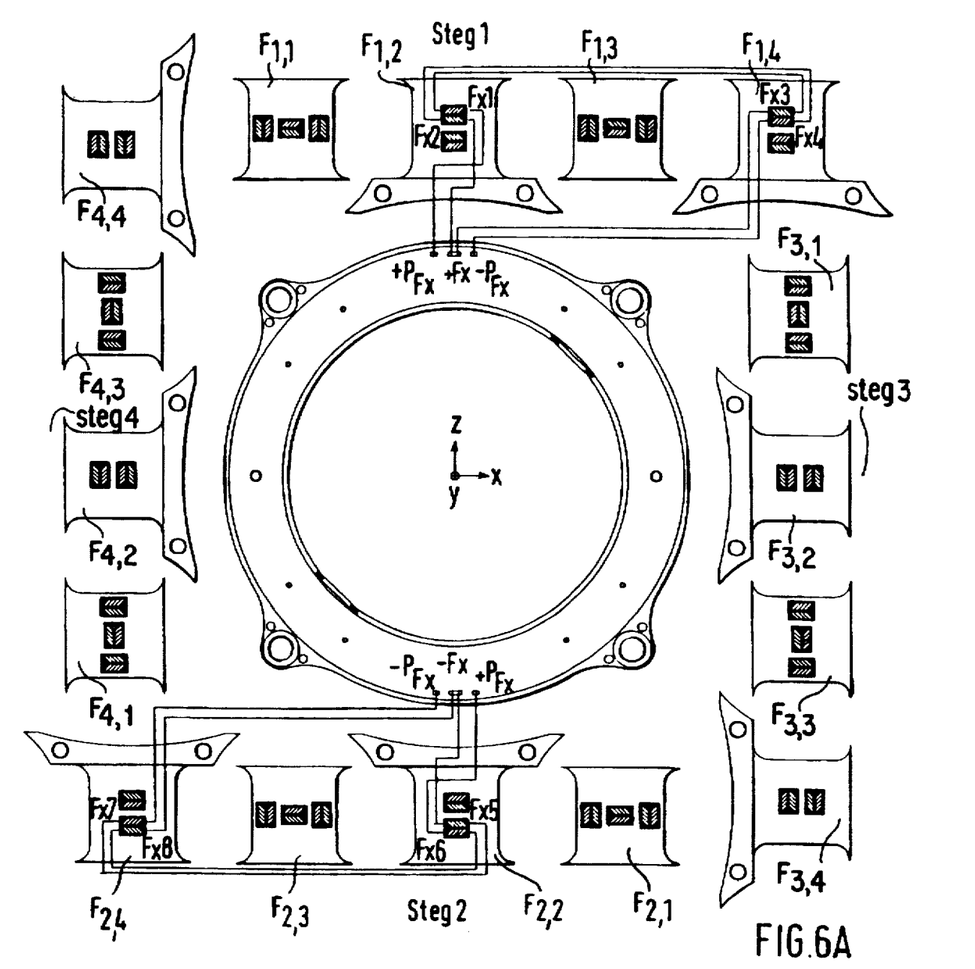
FIG. 6a is a schematic representation of measuring web surfaces present on a wheel force measuring hub assembly, the arrangement and circuits of the strain gauges being illustrated with respect to the detecting of the longitudinal force Fx, in accordance with preferred embodiments of the present invention.
Figure 6B:
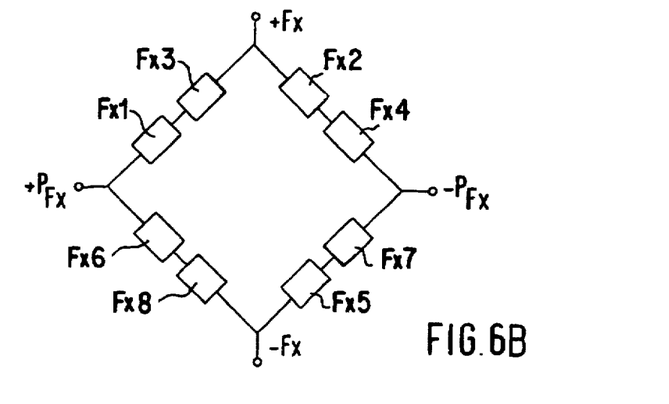
FIG. 6b is a view of the wiring arrangement of the strain gauges from FIG. 6a in a full bridge circuit.

The signal of the longitudinal force Fx is sensed by using a strain gauge full-bridge circuit. As illustrated in FIGS. 6a and 6b, this full bridge consists of four branches with two series-connected strain gauges respectively. The precise arrangement and wiring is shown in detail in FIG. 6a. The supply voltage is fed to the connections marked ±P and the measuring signal is taken at the connections marked ±Fx.

FIG. 6b is a wiring diagram of a full-bridge circuit, the individual strain gauges Fx1 to Fx8 being arranged on the measuring webs or measuring web surfaces indicated in FIG. 6a.

FIGS. 6a and 6b show that, under the effect of a longitudinal force Fx in the positive direction, the strain gauges Fx1, Fx3, Fx5 and Fx7 experience the same deformation, specifically a positive resistance change (strain). In this manner, the position of these strain gauges in the full bridge is determined so that Fx1 and Fx3 must be placed in the same bridge branch because they are applied to the front and rear side of a measuring web.

In contrast, the strain gauges Fx2, Fx4, Fx6 and Fx8 experience a negative resistance change. They must therefore be connected in adjacent bridge branches. The reason is an addition is caused in this manner of all strain values so that the sensitivity of this full bridge is increased.

If the bridge resistances R1 to R4 (R1=Fx1+Fx3; R2=Fx6+Fx8; etc.) change in their value by the amount ΔR, the bridge circuit is "detuned" and an output voltage UA is present between points +Fx and −Fx.

If the measuring webs 1 and 2 are loaded by lateral forces, torsional forces are created. However, on the front and rear side of a web, two series-connected strain gauges are situated. One experiences a positive and the other experiences a negative resistance change ΔR. Since both are situated in the same bridge branch, they compensate one another and, as a result, no torsional or lateral forces are measured although the corresponding webs twist. Because of the described strain gauge arrangement and connecting, a crosstalk of the force and torque components is excluded.

The strain gauge circuit for sensing the wheel contact force Fz in its method of operation and design corresponds to the full bridge circuit for detecting the longitudinal force Fx. Eight strain gauges are applied to the measuring webs 3 and 4 corresponding to FIG. 7a which are offset with respect to the measuring webs 1 and 2 by 90°.

Figure 7A:
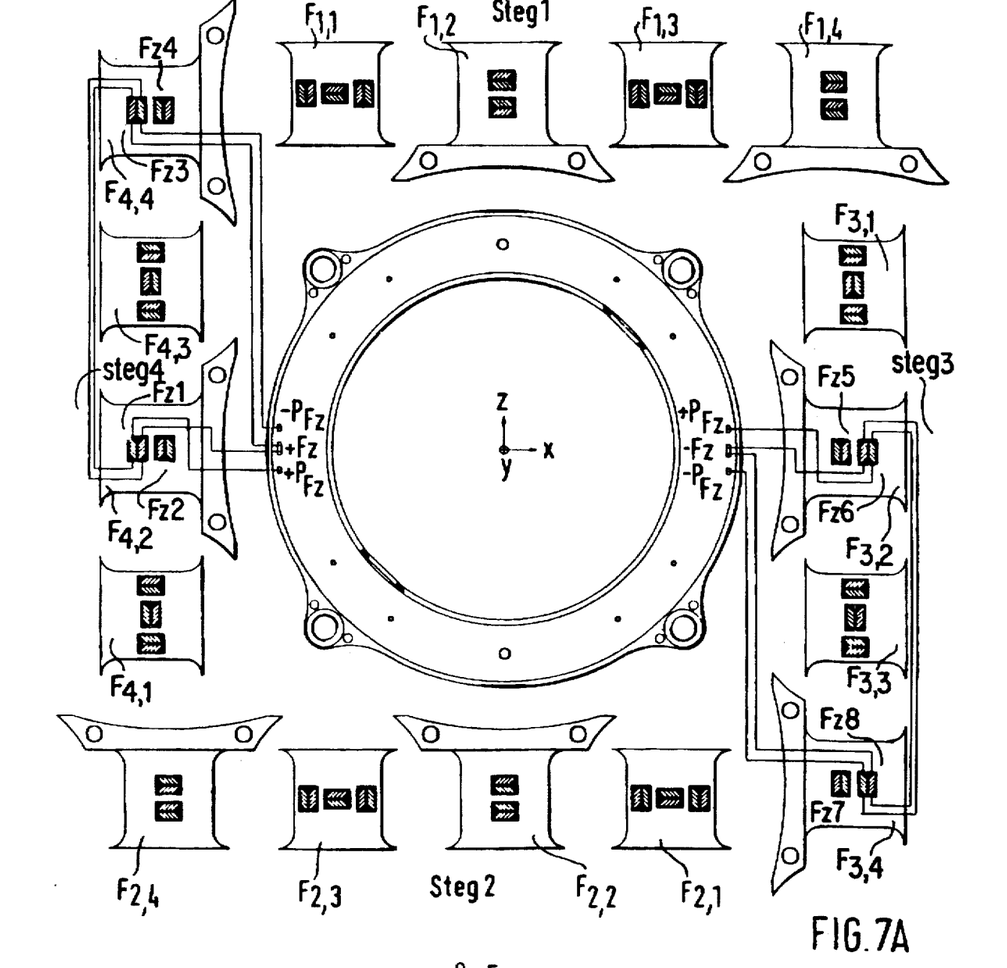
FIG. 7a is a representation as in FIG. 6a, showing an arrangement and circuit of strain gauges with respect to the detection of the wheel contact force Fz, in accordance with preferred embodiments of the present invention.
Figure 7B:
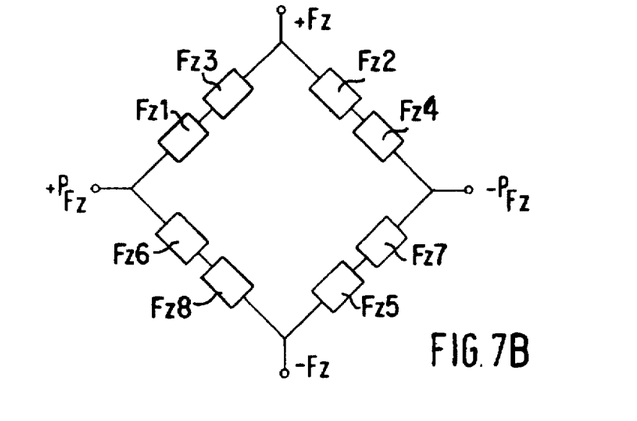

In the case of a force in the Z-direction, the strain gauges Fz1 to Fz8 experience a resistance change analogous to that of the wire strain gauges Fx1 to Fx8, so that the method of operation does not have to be explained in detail.

On the whole, it is achieved by means of the above-mentioned connections that the detection of the longitudinal forces and of the wheel contact forces in the case of the rotating wheel is made possible by using two identical measuring points which are offset by 90° with respect to one another. The detection of these forces takes place in the system of coordinates of the wheel; that is, when the wheel rotates, a sinusoidal course is obtained for Fx and Fz. By means of a time-synchronously detected angle of rotation of the wheel, a transformation of coordinates is possible and the occurring forces are obtained relative to the system of coordinates of the vehicle.

For determining the lateral force Fy, a full-bridge circuit consisting of sixteen wire strain gauges is applied to the four measuring webs 1–4, two strain gauges respectively being arranged on the left and right side of each web. In each bridge branch of this circuit, two pairs of series-connected strain gauges are situated in a parallel connection, as illustrated in FIGS. 8a and 8b.

Eight of the sixteen applied strain gauges, specifically those with the even index numbers Fy2, Fy4 to Fy16, in the case of the effect of a positive lateral force (toward the inside) experience the same resistance change, thus a positive strain. The strain gauges situated on the same web are connected in series. The parallel connection takes place by means of the two strain gauges of the same resistance change of the next measuring web offset by 90°.

In contrast, the remaining strain gauges Fy1, Fy3 to Fy15 having the uneven index numbers experience a negative resistance change (upsetting). These are therefore connected in the adjacent bridge branches according to the same diagram as the previous strain gauges. By means of the described strain gauge arrangement and connection, a crosstalk of the longitudinal and wheel contact forces is excluded.

Figure 8A:
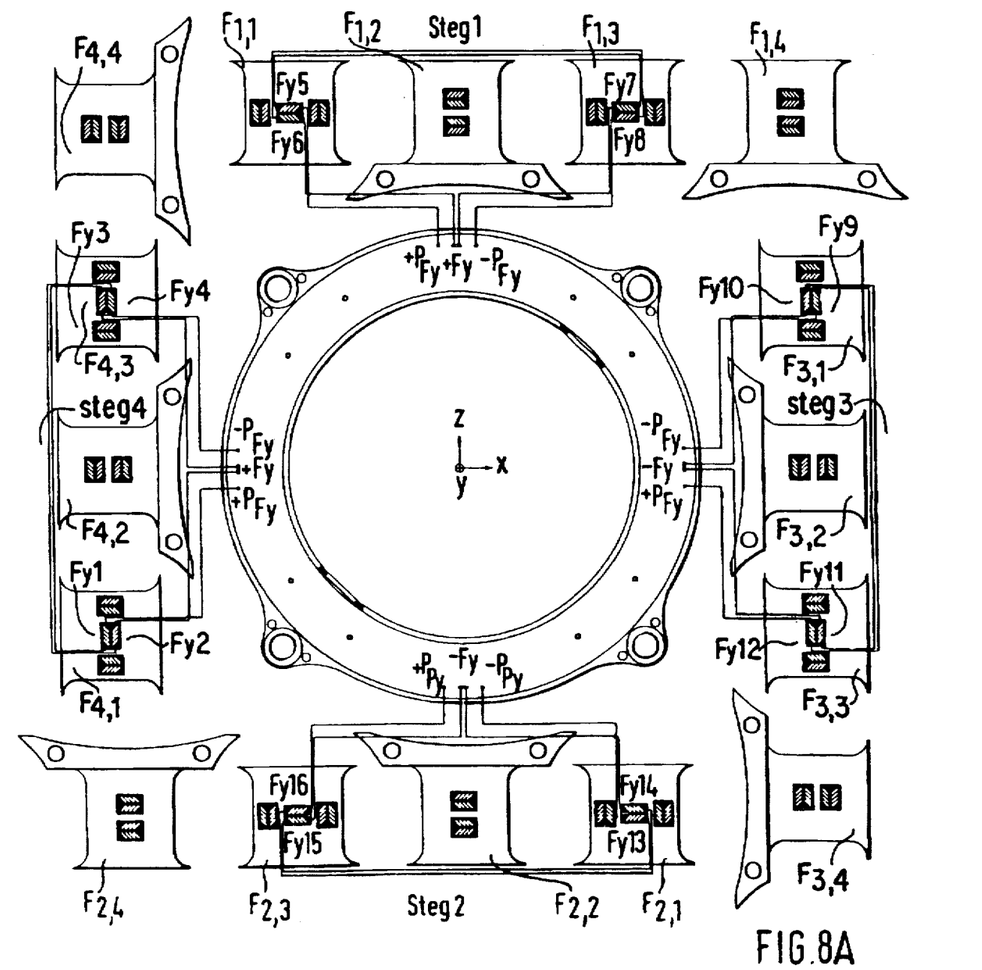
FIG. 8a is a representation as in FIG. 6a but showing an arrangement and connection of the strain gauges for detecting the lateral wheel force Fy, in accordance with preferred embodiments of the present invention.
Figure 8B:
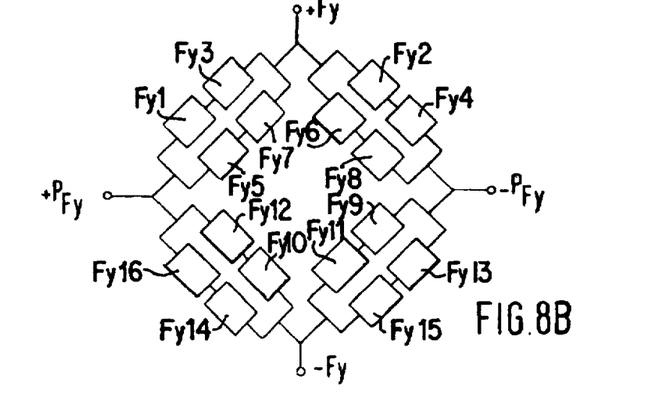

The full-bridge circuit illustrated in FIGS. 8a and 8b permits the detecting of the load laterally acting upon the wheel, independently of the lever arm, of the type of tire and of the tire size.

Figure 9A:
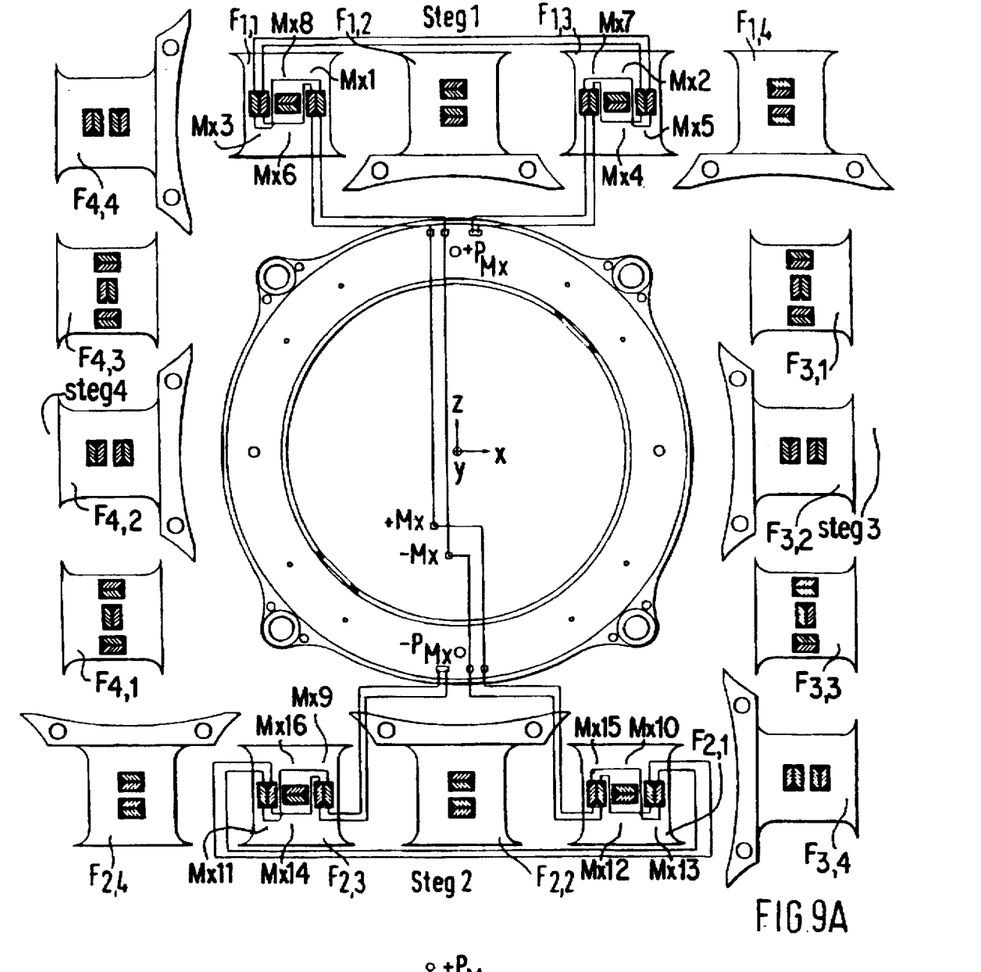
FIG. 9a is a representation as in FIG. 6a but showing an arrangement and connecting of the strain gauges for detecting the camber torque Mx, in accordance with preferred embodiments of the present invention.
Figure 9B:
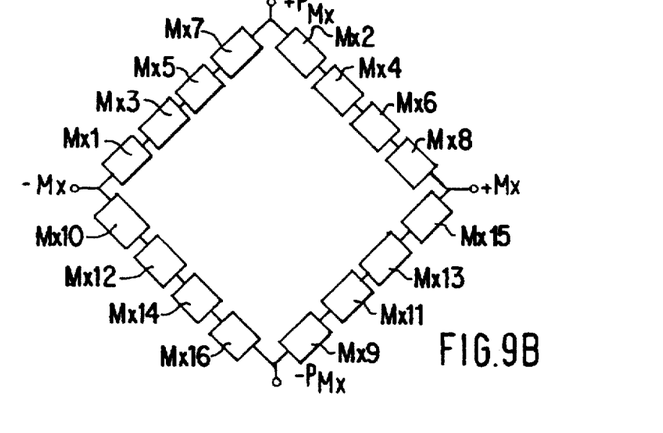
FIG. 9b is a view of the electric wiring arrangement, in which case the connecting of the strain gauges is shown according to FIG. 9a in a full bridge circuit.

The camber torque Mx about the longitudinal axis X caused by the lateral and/or wheel contact forces is measured by using a circuit as illustrated in FIGS. 9a and 9b. This circuit consists of 16 strain gauges which are laterally applied to the measuring webs 1 and 2. In each bridge branch, four strain gauges are situated which are connected in series. When a negative camber torque Mx occurs—the wheel moves from the positive into the negative camber—, at the zero-degree position (measuring web 1 on top), the strain gauges Mx1, Mx3, Mx5 and Mx7 pointing on top into the interior wheel side are strained in the positive direction. Analogously thereto, the strain gauges of the opposite bridge branch for generating the same resistance change, must be placed such that, in the case of the movement pointing toward the bottom exterior side of the wheel, they also experience a positive strain.

In this manner, the lateral forces are not detected but only the torque Mx caused by them. When the strain gauges for determining the lateral force Fy on the measuring web 1 are considered, they are situated precisely mirror-invertedly to that of measuring web 2. In contrast, the strain gauges of the torque Mx are not situated symmetrically with respect to one another on the measuring web 1 and 2. As a result of this selected position of the measuring webs, the crosstalk of the other loads onto the torque Mx is avoided.

The residual strain gauges are correspondingly connected in the adjacent bridge branches. It can also be recognized that two of the four series-connected strain gauges are situated on each measuring web side. This contributes to a better sensitivity of the bridge circuit and thus to the signal quality.

Figure 10A:
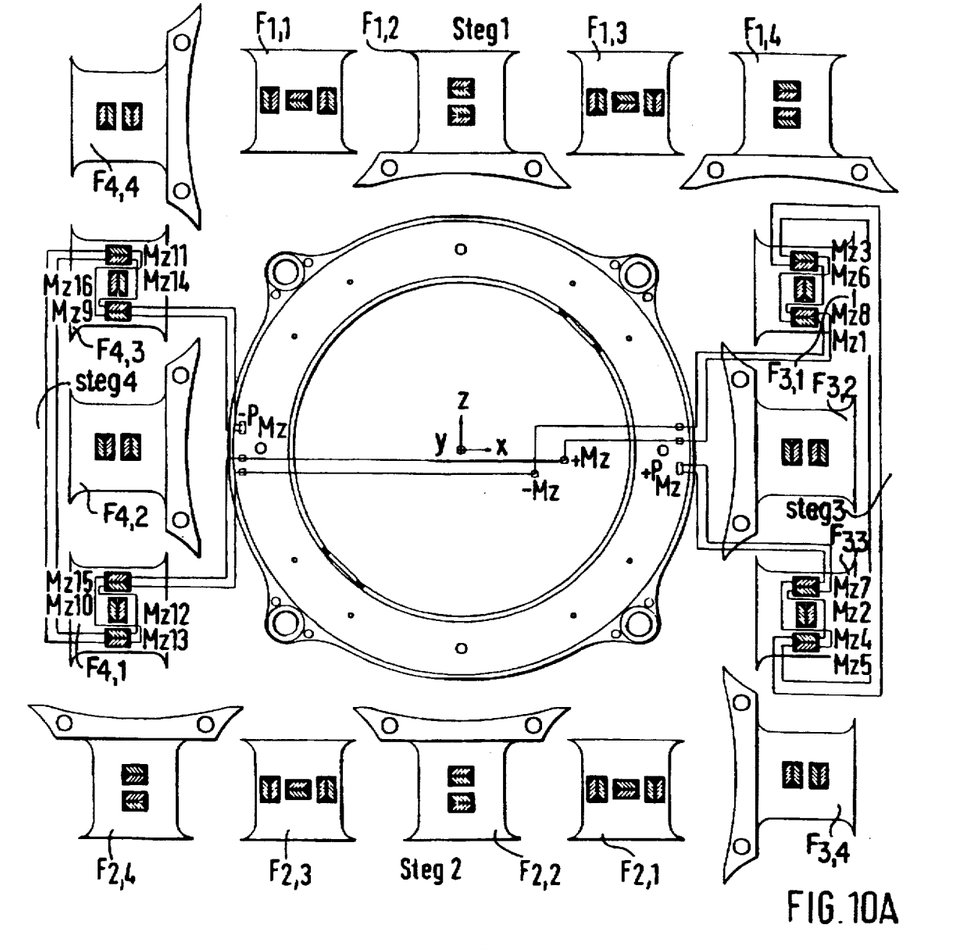
FIG. 10a is a representation as in FIG. 6a, showing an arrangement and connecting of the strain gauges for detecting the return torque Mz, in accordance with preferred embodiments of the present invention.
Figure 10B:
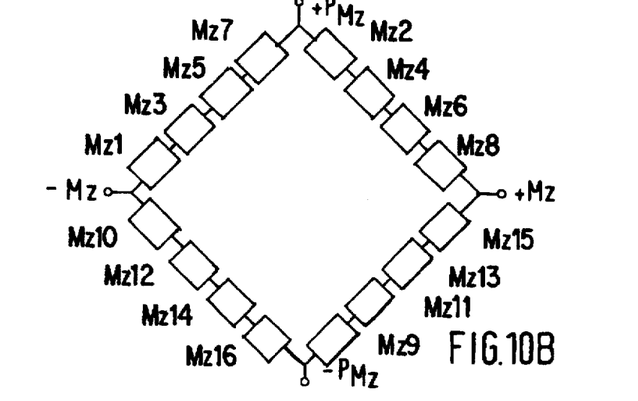

The wiring for determining the return torque Mz corresponds in its design and method of operation analogously to the full bridge circuit of the camber torque Mx.

This is expressed in FIGS. 10a and 10b, in which case the statements for the strain gauges Mz1 to Mz16 apply analogously to the statements concerning the camber torque Mx.

In the case of the effect of a positive return torque about the vertical axis Z viewed counterclockwise in the zero-degree position, eight of the sixteen strain gauges experience a positive resistance change (strain), specifically the resistances with even index number Mz2 to Mz16. The remaining strain gauges are rotated in the negative direction (upsetting). The strain gauges with the same resistance change, which are situated on a measuring web, are connected in series as in the case of the camber torque.

Since this strain gauge circuit is situated offset by 90° with respect to that of the camber torque on the measuring webs 3 and 4, it is ensured that two identical measuring points are created which, during the rotation of the torque indicator, alternately determine the camber torque and the return torque.

Consequently, during the recording of the signals during a wheel rotation under a load for both measuring points two sine waves are obtained which are offset with respect to one another by 90°. By way of the angle function relative to the system of coordinates of the vehicle, the camber torque Mx and the return torque Mz can be determined by means of suitable computing processes.

A very important measuring quantity is the braking drive torque My. In vehicle development, it is required for the dimensioning and testing of different drive and chassis components.

Figure 11A:
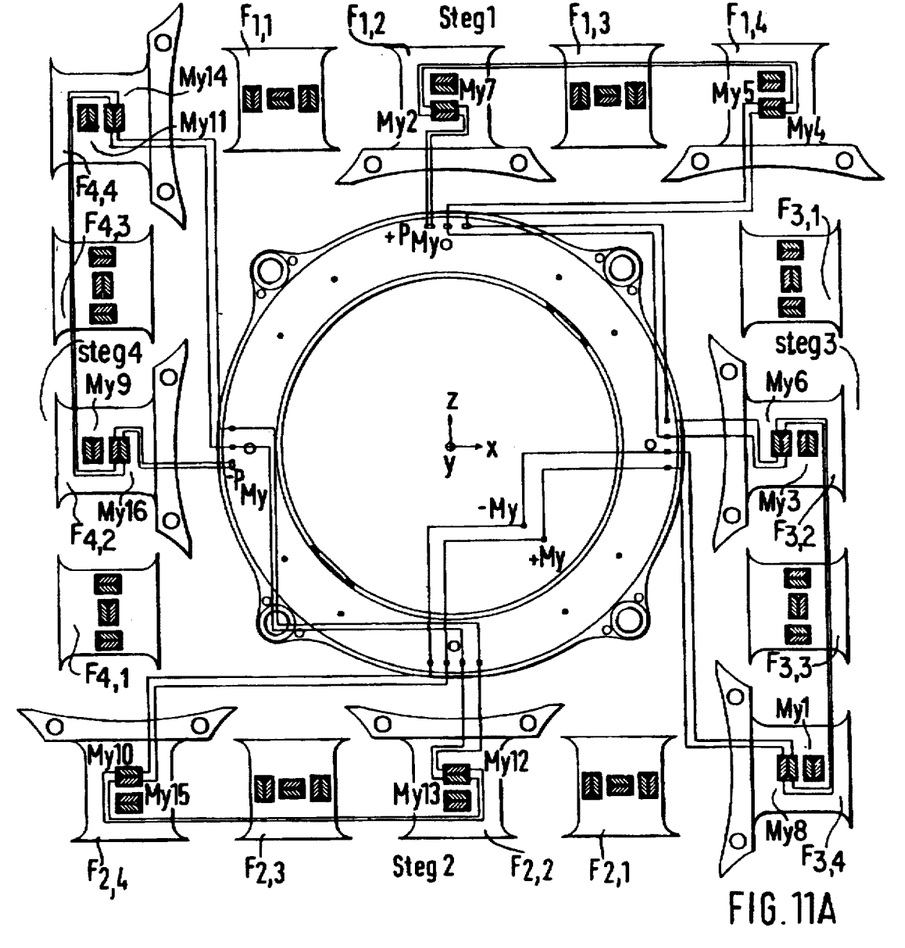
FIG. 11a is a representation as in FIG. 6a showing an arrangement and connecting of strain gauges for detecting the braking torque My, in accordance with preferred embodiments of the present invention.
Figure 11B:
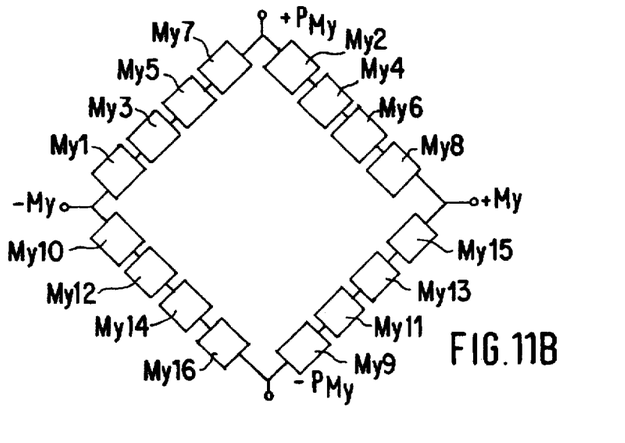

For detecting the torque signal, according to FIGS. 11a and 11b, sixteen strain gauges are connected in a full bridge. To the front and rear side of all four measuring webs 1–4, four strain gauges respectively are applied. According to FIG. 11b, four series-connected strain gauges are situated in each bridge echo branch; two strain gauges thereof are mounted on the same webs and the other two are mounted on the next measuring webs offset by 90°.

The longitudinal force itself is not measured by this circuit but only the braking torque caused by it.

When a positive braking torque acts clockwise, for example, on a right-mounted front wheel of a motor vehicle, all strain gauges of the mutually opposite bridge branches experience the same resistance change. In this case, the strain gauges with the even index numbers My2 to My16 experience a positive strain. The remaining strain gauges having the uneven index numbers My1 to My15, in contrast, experience a negative resistance change.

This makes it possible that the strain values of all participating active wire stain gauges are added up and thus a very good sensitivity of this full bridge is ensured. If the body were provided with half bridges or quarter bridges, with the same load, only one half or one fourth of the output signal would be obtained. By the use of four active bridge branches of the same resistance value, this wiring—like the previous five full bridges with also four active branches—has the bridge factor 4.

On the whole, eighty strain gauges were arranged on all four measuring webs 1–4.

By means of the present wheel force measuring hub assembly, a system is provided which is capable of detecting in a perfect and time-synchronous manner all six components of the occurring wheel forces and wheel torques.

During measurements which are to indicate the operating loads without crosstalk in a hysteresis-free manner on a motor vehicle, all four wheels of the motor vehicle are equipped with the above-mentioned wheel torque indicators. Subsequently, the operating loads determined in the driving operation are simulated on servohydraulic test stands. For this purpose, by means of an ITFC-process or an RPC-process (ITFC=Iterative Transfer Function Compensation; RPC=Remote Parameter Control), the control data are newly calculated and changed until the desired data (driving operation) correspond to the actual data (test stand simulation). For this operation and the resulting quality of an operating load reproduction test, it is required to detect the desired and actual values at the same measuring location. This requirement is met by the use of the multi-component wheel force measuring hub assembly according to the present invention.

The simultaneous recording of the longitudinal and the lateral force, the wheel load, the return, camber and driving and braking torque is possible. The actual measurement generators of the measuring hub assembly are the four wire strain webs which are arranged in a spoke shape (in each case, offset by 90°) and equipped with strain gauges, in which case only shearing strains are determined.

The wheel force measuring hub assembly is a complex measuring system for the signal detection, signal processing and providing of the measuring values in the form of bit-serial data at the site whose transmission to the vehicle takes place, for example, by means of IR telemetry. On the receiver-side, after the decoding, transformation and computing relative to the system of coordinates of the vehicle, the measuring data are available in an analog form as well as digitally, bit-serially.

The voltage supply of the rotating part of the system is ensured by means of an inductive power transmission.

For the angle sensing and rotating direction recognition, a pulse ring 27 (FIG. 2) and two active Hall sensors (not shown) as well as a corresponding electronic control unit are provided. The pulse ring 27 is arranged on the interior side of the wheel; the Hall sensors are fastened by way of simple holding devices on chassis components. In the case of some previously used wheel force indicating systems, the sensor for determining the wheel angle is fixed by way of holding bows (for example, on the front axle of a spring strut stand pipe). Camber angle changes caused by steering maneuvers influence the wheel angle signal. The falsification is avoided by the use of the pulse ring for determining the wheel position.

The overall weight of the wheel torque indicator is low so that, in the case of dynamic measurements, mass falsifications remain low. In this case, the weight was approximated to that of the original wheels, in which case it should be taken into account that a safety component is involved which should be sufficiently dimensioned and should have a long operating life. For these reasons, in the construction and optimizing phase of the measuring body, a finite element calculation was carried out. During the start of the operation of the measuring system, extensive operating strength tests were carried out on wheel test stands.

When selecting the materials, requirements were taken into account with respect to the function, the stress and the useful life as well as the manufacturing costs. Materials for measuring value sensors on a strain gauge basis must simultaneously have a high sensitivity as well as a sufficient fatigue strength under reversed bending stresses. Since these characteristics are opposite, a compromise must be found. In order to achieve this, a material is selected which has a medium modulus of elasticity and high strength values. In addition, the measuring body must be designed such that it has the highest sensitivity at the points to be measured and has a stiffer dimensioning at the other points.

A good measuring signal resolution is required while the crosstalk of the individual components must be low.

Since the wheel forces are measured in the circulating system of coordinates, a transformation of coordinates into the system of coordinates fixed to the vehicle must take place. For this reason, the absolute angular position of the wheel with respect to the system of coordinates of the vehicle must be sensed continuously.

Since the angle encoder is an incremental generator, the direction of the wheel rotation must be sensed in order to avoid that in the preceding sign different angle changes of the wheel are added and are erroneously interpreted as a rotation.

From the combination of the rotating direction and of pulses of the incremental generator, the absolute angle position of the wheel is obtained. This is the basis of the above-mentioned transformation.

The occurring thermal stresses caused by high brake disk temperatures, for example, as the result of resulting braking from high speeds or later in the stand must not lead to a failure of the measuring system. A good air flow must take place around the measuring value sensor with the integrated electronic system. Heat build-ups must be avoided. Care should also be taken that the thermal conditions of the braking system (temperature level, cooling performance) come very close to the series stand. Only if these conditions are met will the measured braking torques and forces be representative.

For this reason, the wheel torque indicator should be covered only in the area of the four measuring webs in order to ensure a better flow-around and avoid a failure of the measuring system.

In a ring-shaped housing 24 (FIG. 2) in the measuring value sensor 5, the circuits of the six strain gauge bridges, the analogous signal processing and transformation, the circuits for the voltage stabilizing and for the bridge supply are situated on several superimposed ring plate bars.

The data transmission takes place by means of an infrared transmission. For example, in the interior ring part 12 of the measuring value sensor 5, a cylindrical housing 23 is arranged in which the opto-electronic path is housed for the data transmission from the stator to the rotor as well as the coil system with the pertaining electronic system for the power transmission from the stator to the rotor.

The voltage supply to the rotating part of the system takes place by means of an inductive transmission.

On the receiver side, after the decoding, transformation and computing, the measuring data are provided in an analog form as well as in a digital, bit-parallel and word-serial manner.

The construction of the whole electronic system takes place in a current-saving SMD-technology and achieves a reduction of the overall volume and of the weight.

By the interconnection of the strain gauges to full bridges, a perfect separation of the components is achieved. With restrictions, the number of webs is freely selectible. However, in the present case, because of an optimizing with respect to a corresponding application, a measuring web number of four was selected. The use of modern PCM-telemetry with an infrared transmission path ensures maximal safety with respect to disturbances and precision. The advantage of no-contact transmission paths in contrast to slip ring rotary transmitters is the low space requirement, the low weight and a no-wear method of operation.

Figure 3:
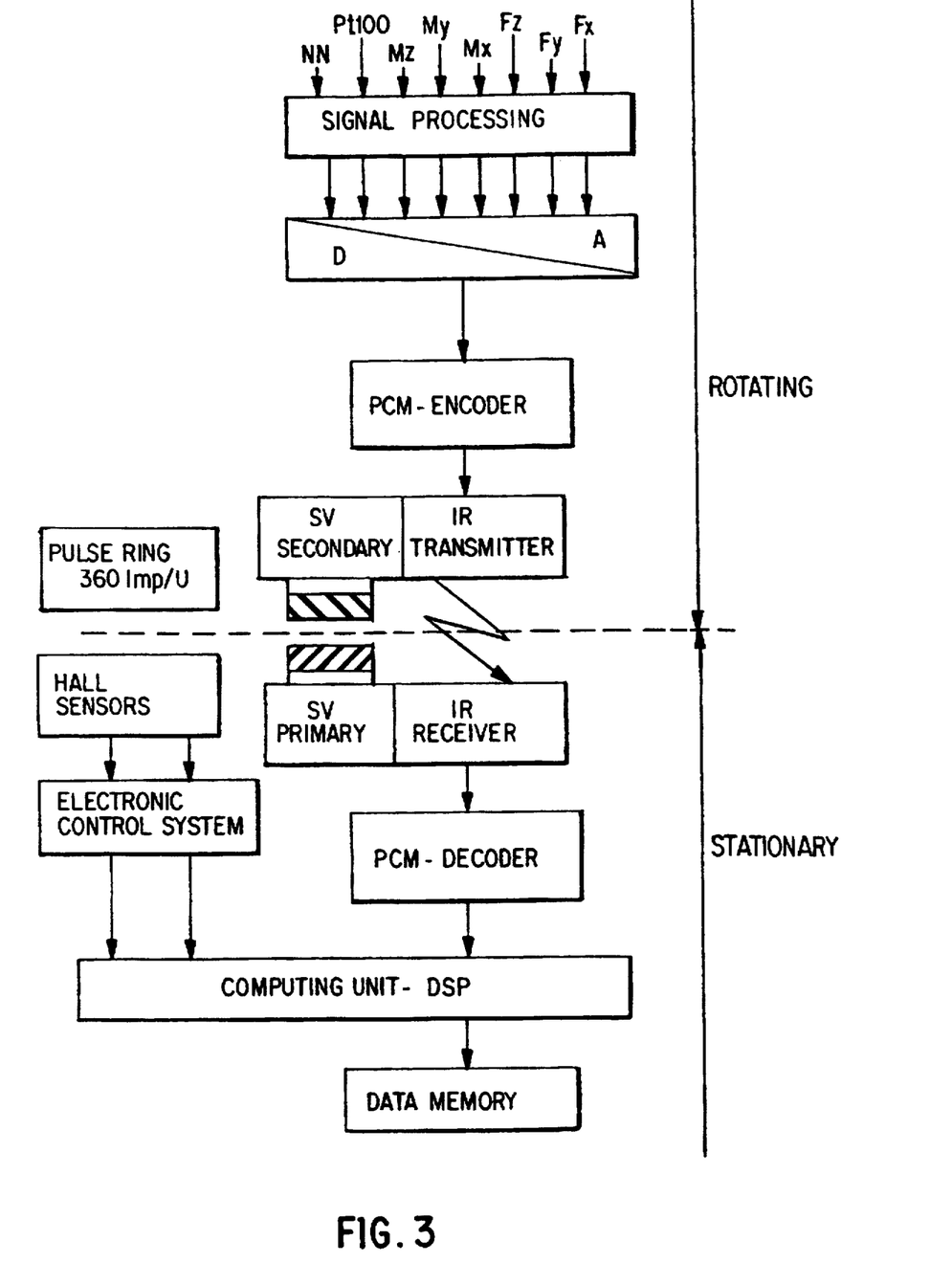
FIG. 3 is a schematic block diagram depicting operational components of the wheel force measuring hub assembly according to preferred embodiments of the invention.

FIG. 3 is a block diagram for the signal regenerating and processing, a part being arranged on the rotating part of the wheel force measuring hub assembly and another part being stationary.

The signals are transmitted, decoded and the measuring values are converted from the rotating system of coordinates of the wheel to the system of coordinates of the vehicle. For this purpose, the angular position of the wheel is detected time-synchronously with respect to the receiving of the measuring signals.

In a computing unit existing, for example, in the vehicle, the measuring values are computed, for example, by means of a microprocessor. After the synchronizing, a time-related assignment of the measuring values to the rotating angle of the wheel is obtained. In this manner, the absolute forces in the system of coordinates of the vehicle are obtained which are independent of the wheel position.

In principle, in addition to the measuring hub assembly value sensor, a modified rim, a wheel flange and a PCM telemetry transmission device as well as a pulse ring and two Hall sensors for determining the angular position of the wheel are required according to the above-mentioned embodiment.

The power flux received by the wheel extends along the rim to the exterior ring part 10 of the measuring body further along the four measuring webs to the interior ring part 12 of the wheel torque indicator, and then to the wheel flange.

The cross-section of the webs must be sufficiently dimensioned so that the resulting tensions are below the yielding point or the elasticity limit of the material in the case of maximally occurring stresses or stress combinations. Plastic deformation parts would make the sensor useless for the planned application.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Wheel force measuring hub assembly comprising:
   an exterior ring part adapted to be mounted at a wheel rim,
   an interior ring part adapted to be mounted at a vehicle axle,
   a plurality of radially extending measuring webs connecting the exterior ring part and the interior ring part,
   and strain gauges arranged on the measuring webs for determining forces, including torques acting on the webs,
   wherein said strain gauges are configured such that wheel forces $F_x$, $F_y$, $F_z$, $M_x$, $M_y$ and $M_z$ are determined exclusively by way of shearing strains on said strain gauges to decouple individual force components from one another.

2. Wheel force measuring hub assembly according to claim 1, wherein said strain gauges are configured and arranged to provide six separate signals representing wheel forces along and around three mutually perpendicular wheel axes.

3. Wheel force measuring hub assembly according to claim 1, wherein respective openings are arranged in said webs in an area of respective transitions between the webs and the exterior ring part.

4. Wheel force measuring hub assembly according to claim 2, wherein respective openings are arranged in said webs in an area of respective transitions between the webs and the exterior ring part.

5. Wheel force measuring hub assembly according to claim 3, wherein said respective openings are in the form of oblong holes.

6. Wheel force measuring hub assembly according to claim 4, wherein said respective openings are in the form of oblong holes.

7. Wheel force measuring hub assembly according to claim 3, wherein the length and dimensioning of the openings is coordinated such that a separation of forces and torques is achieved as well as a high measuring sensitivity.

8. Wheel force measuring hub assembly according to claim 4, wherein the length and dimensioning of the openings is coordinated such that a separation of forces and torques is achieved as well as a high measuring sensitivity.

9. Wheel force measuring hub assembly according to claim 1, wherein a transmitting device is provided which transmits data obtained by the strain gauges to a vehicle-fixed part.

10. Wheel force measuring hub assembly according to claim 1, wherein a transmitting device is provided which transmits said signals to a vehicle fixed part.

11. Wheel force measuring hub assembly according to claim 9, wherein the transmitting device is an infrared telemetry transmitting device.

12. Wheel force measuring hub assembly according to claim 10, wherein the transmitting device is an infrared telemetry transmitting device.

13. Wheel force measuring hub assembly according to claim 1, wherein current supply is provided to said strain gauges by way of induction loops.

14. Wheel force measuring hub assembly according to claim 1, wherein an installation space in the interior ring part is hermetically sealed for accommodating an electronic control and analysis system.

15. Wheel force measuring hub assembly according to claim 14, wherein the electronic control and analysis system is operable to convert wheel forces in real-time and on-line from rotating system of coordinates of the wheel to a system of coordinates of a vehicle on which the wheel is mounted.

16. Wheel force measuring hub assembly according to claim 1, wherein a control and analysis system is accommodated in the interior ring part for processing signals representing the wheel forces.

17. Wheel force measuring hub assembly according to claim 1, wherein said strain gauges include longitudinal force measuring strain gauges which are arranged on the measuring webs disposed perpendicularly with respect to a vehicle driving direction and on measuring web surfaces which are aligned in parallel to a radial plane of the hub assembly sensor.

18. Wheel force measuring hub assembly according to claim 17, wherein four measuring webs 14 are provided, and
   wherein the longitudinal force measuring strain gauges are connected in a full bridge circuit and, in the four branches of the full bridge circuit, two series-connected longitudinal force measuring strain gauges are provided, two longitudinal force measuring strain gauges of one branch being arranged on mutually opposite surfaces of a respective measuring web.

19. Wheel force measuring hub assembly according to claim 1, wherein said strain gauges include wheel contact force measuring strain gauges which are arranged on the measuring webs aligned in a vehicle driving direction and on measuring web surfaces which are aligned in parallel to a radial plane of the hub assembly.

20. Wheel force measuring hub assembly according to claim 19, wherein four measuring webs are provided, and
wherein the wheel contact force measuring strain gauges are connected in a full bridge circuit and, in the four branches of the full bridge circuit, two series-connected contact force measuring strain gauges respectively are arranged, the two strain gauges of one branch being provided on mutually opposite surfaces of a measuring web.

21. Wheel force measuring hub assembly according to claim 1, wherein said strain gauges include wheel lateral force measuring strain gauges which are arranged on all measuring webs and are arranged there on surfaces which are each perpendicular to a radial direction of the hub assembly.

22. Wheel force measuring hub assembly according to claim 21, wherein four measuring webs are provided, and
wherein the wheel lateral force measuring strain gauges are connected to a full bridge circuit and two series-connected wheel lateral force measuring strain gauges respectively are connected in parallel in a branch of the full bridge circuit, the two wheel lateral force measuring strain gauges being arranged in a respective series connection on opposite surfaces of one measuring web respectively and the two wheel lateral force measuring strain gauges of a parallel connection of the respective series connections being disposed perpendicularly on one another in measuring webs assigned to a branch of the full bridge.

23. Wheel force measuring hub assembly according to claim 1, wherein the strain gauges include camber torque measuring strain gauges which are arranged on the measuring webs arranged perpendicularly to the driving direction and on surfaces which are each perpendicular to a radial axis of the hub assembly.

24. Wheel force measuring hub assembly according to claim 23, wherein four measuring webs are provided, and
wherein the camber torque measuring strain gauges are connected in a full bridge circuit, four camber torque measuring strain gauges being connected in series in each branch of the full bridge circuit, of which two camber torque measuring strain gauges respectively are arranged on opposite sides of a measuring web.

25. Wheel force measuring hub assembly according to claim 1, wherein the strain gauges include return torque measuring strain gauges which are arranged on measuring webs aligned in wheel driving directions and on measuring web surfaces which are each perpendicular with respect to a radial direction of the hub assembly.

26. Wheel force measuring hub assembly according to claim 25, wherein four measuring webs are provided, and
wherein the return torque measuring strain gauges are each connected in a full bridge circuit and four of the torque strain gauges are connected in series in each branch of the full bridge circuit, of which two return torque measuring strain gauges respectively are arranged on two opposite sides of a measuring web.

27. Wheel force measuring hub assembly according to claim 1, wherein the strain gauges include braking torque measuring strain gauges which are arranged on all measuring webs and on measuring web surfaces which are each parallel to a radial plane of the hub assembly.

28. Wheel force measuring hub assembly according to claim 27, wherein four measuring webs are provided, and
wherein the braking torque measuring strain gauges are connected in a full bridge circuit and four braking torque measuring strain gauges are connected in series in each branch of the full bridge circuit, of which two braking torque measuring strain gauges are arranged on mutually opposite sides of a measuring web and the other two strain gauges are arranged on mutually opposite sides of a measuring web angularly offset by 90°.

29. Wheel force measuring hub assembly according to claim 1, wherein the strain gauges arranged on the measuring webs are covered.

30. Wheel force measuring hub assembly according to claim 1, wherein individual strain gauges are connected to respective bridge circuits on a ring-shaped plate bar.

31. Wheel force measuring hub assembly according to claim 1, wherein a total of four measuring webs are provided which are each angularly offset by 90°.

32. Wheel force measuring hub assembly according to claim 17, wherein said strain gauges include wheel contact force measuring strain gauges which are arranged on the measuring webs aligned in a vehicle driving direction and on measuring web surfaces which are aligned in parallel to a radial plane of the hub assembly.

33. Wheel force measuring hub assembly according to claim 17, wherein said strain gauges include wheel lateral force measuring strain gauges which are arranged on all measuring webs and are arranged there on surfaces which are each perpendicular to a radial direction of the hub assembly.

34. Wheel force measuring hub assembly according to claim 17, wherein the strain gauges include camber torque measuring strain gauges which are arranged on the measuring webs arranged perpendicularly to the driving direction and on surfaces which are each perpendicular to a radial axis of the hub assembly.

35. Wheel force measuring hub assembly according to claim 17, wherein the strain gauges include return torque measuring strain gauges which are arranged on measuring webs aligned in wheel driving directions and on measuring web surfaces which are each perpendicular with respect to a radial direction of the hub assembly.

36. Wheel force measuring hub assembly according to claim 17, wherein the strain gauges include braking torque My measuring strain gauges which are arranged on all measuring webs and on measuring web surfaces which are each parallel to a radial plane of the hub assembly.

37. Wheel force measuring hub assembly according to claim 32, wherein said strain gauges include wheel strain gauges which are arranged on all measuring webs and are arranged there on surfaces which are each perpendicular to a radial direction of the hub assembly.

38. Wheel force measuring hub assembly according to claim 32, wherein four measuring webs are provided, and
wherein the wheel lateral force measuring strain gauges are connected to a full bridge circuit and two series-connected wheel lateral force measuring strain gauges respectively are connected in parallel in a branch of the full bridge circuit, the two wheel lateral force measuring strain gauges being arranged in a respective series connection on opposite surfaces of one measuring web respectively and the two wheel lateral force measuring strain gauges of a parallel connection of the respective series connections being disposed perpendicularly on one another in measuring webs assigned to a branch of the full bridge.

39. Wheel force measuring hub assembly according to claim 32, wherein the strain gauges include return torque measuring strain gauges which are arranged on measuring webs aligned in wheel driving directions and on measuring web surfaces which are each perpendicular with respect to a radial direction of the hub assembly.

40. Wheel force measuring hub assembly according to claim 32, wherein the strain gauges include braking torque measuring strain gauges which are arranged on all measuring webs and on measuring web surfaces which are each parallel to a radial plane of the hub assembly.

41. Wheel force measuring hub assembly according to claim 37, wherein the strain gauges include return torque measuring strain gauges which are arranged on measuring webs aligned in wheel driving directions and on measuring web surfaces which are each perpendicular with respect to a radial direction of the hub assembly.

42. Wheel force measuring hub assembly according to claim 41, wherein the strain gauges include braking torque measuring strain gauges which are arranged on all measuring webs and on measuring web surfaces which are each parallel to a radial plane of the hub assembly.

43. Wheel force measuring hub assembly according to claim 42, wherein at least one Hall sensor is provided which interacts with a pulse ring for determining at least one of an angular position and a rotating direction of a wheel carrying the wheel force measuring assembly.

44. Wheel force measuring hub assembly according to claim 43, wherein a transmitting device is provided which transmits data obtained by the strain gauges to a vehicle-fixed part.

45. In a wheel force measuring hub assembly including an exterior ring part adapted to be mounted at a wheel rim, an interior ring part adapted to be mounted at a vehicle axle, and a plurality of radially extending measuring webs connecting the exterior ring part and the interior ring part, the improvement consisting of strain gauges arranged on the measuring webs in a configuration such that wheel forces $F_x$, $F_y$ and $F_z$ and torques $M_x$, $M_y$ and $M_z$ are determined exclusively via shearing strains acting on said strain gauges to decouple individual force and torque components from one another.

46. Wheel force measuring hub assembly, comprising:
an exterior ring part adapted to be mounted at a wheel rim;
an interior ring part adapted to be mounted at a vehicle axle;
a plurality of radially extending measuring webs connecting the exterior ring part and the interior ring part;
strain gauges arranged on the measuring webs for determining forces and torques to be measured; and
wherein said strain gauges are arranged, aligned and connected with one another such that the forces and torques $F_x$, $F_y$, $F_z$ and $M_x$, $M_y$, $M_z$ are determined exclusively via shearing strains acting on said strain gauges to decouple individual forge and torque components from one another.

47. A wheel force indicator, comprising:
a measuring assembly including an exterior ring part, an interior ring part, and a plurality of radially extending measuring webs connecting the exterior and interior ring parts;
a wheel rim arranged on the exterior ring part of the measuring assembly;
a wheel flange arranged on the interior ring part of the measuring assembly; and
strain gauges arranged on the radially extending measuring webs for determining forces and torques to be measured, wherein said strain gauges are aligned and connected with one another such that the forces and torques are determined exclusively via shearing strains which occur during loading of the wheel force indicator to decouple individual force and torque components from one another.

48. Wheel force measuring hub assembly according to claim 1, wherein at least one Hall sensor is provided which interacts with a pulse ring for determining at least one of an angular position and a rotating direction of a wheel carrying the wheel force measuring assembly.

49. Wheel force measuring hub assembly according to claim 48, wherein the pulse ring is ferromagnetic.

50. Wheel force measuring hub assembly according to claim 48, wherein the pulse ring has an encoding for determining a 0° angle of the measuring hub assembly.

51. Wheel force measuring hub assembly according to claim 48, wherein the pulse ring is fixed to the exterior ring part.

52. Wheel force measuring hub assembly according to claim 48, wherein two Hall sensors are provided which are angularly offset with respect to one another for permitting a wheel rotating direction sensing.

53. Wheel force measuring hub assembly according to claim 51, wherein two Hall sensors are provided which are angularly offset with respect to one another for permitting a wheel rotating direction sensing.

* * * * *